United States Patent [19]

Hapelt et al.

[11] Patent Number: 4,774,139

[45] Date of Patent: Sep. 27, 1988

[54] THERMOPLASTIC POLYMER

[75] Inventors: Karl-Heinz Hapelt, Bonn; Helmut Knipf, Mechernich, both of Fed. Rep. of Germany

[73] Assignee: Deutsche Atochem Werke GmbH, Bonn, Fed. Rep. of Germany

[21] Appl. No.: 112,234

[22] Filed: Oct. 22, 1987

[30] Foreign Application Priority Data

Oct. 23, 1986 [DE] Fed. Rep. of Germany ....... 3636023

[51] Int. Cl.$^4$ ..................... B32B 27/18; B32B 27/06
[52] U.S. Cl. .................................. 428/407; 524/487; 524/489
[58] Field of Search ................ 524/487, 489; 428/407

[56] References Cited

U.S. PATENT DOCUMENTS

| 3,779,785 | 12/1973 | Stiles et al. | 524/489 |
| 4,012,547 | 3/1977 | Smedberg | 524/487 |
| 4,404,299 | 9/1983 | Decroix | 524/487 |

Primary Examiner—Lewis T. Jacobs
Attorney, Agent, or Firm—Schweitzer & Cornman

[57] ABSTRACT

Thermoplastic hot-melt adhesive granulate for melt-coating, the granulate particles of which have a coating of a film of paraffin with a melting point of 45° C. to 85° C. in an amount of up to 5% by weight, based on the polymer. The antioxidant is present in the film coating. The invention also relates to a method for the manufacture of this hot-melt adhesive granulate and to its used as a hot-melt coating for heat sealing.

3 Claims, No Drawings

THERMOPLASTIC POLYMER

The invention relates to a thermoplastic polymer containing an antioxidant, a method for its preparation and its use.

Thermoplastic polymers, such as polyamides, polyesters, polyurethanes and polyetheresteramides are used on a large scale for different purposes. During use, these polymers are exposed to the action of light and/or air. As a result, they become discolored and their mechanical properties deteriorate as a function of the temperature. To avoid these deficiencies, These polymers are provided with a content of antioxidants (see DE-B-1 111 376).

The addition of processing aids to such thermoplastic polymers to facilitate the further processing, especially in injection molding machines, etc., is also known. In the GB-A-812 613, the addition of beeswax is proposed for this purpose and it is pointed out that the usual processing aids, such as paraffin waxes, are unsuitable (GB-A 812 613, page 2, line 16).

The so-called hot-melt adhesives are a special class of thermoplastic polymers. These polymers may be polyamides, polyesters, polyurethanes, polyetheresteramides, polyolefins and ethylene/vinyl acetate copolymers. They are used on a very large scale for heat sealing and hot-melt gluing of materials of different types, especially in the area of textiles. Such hot-melt adhesives are described, for example in the DE-C-594 233 and in the DE-A-19 39 755, 23 24 159, 23 24 160, 24 36 430, 25 34 121, 32 47 755 and 33 15 529. For this area of use, the hot-melt adhesives are usually produced as granulates, which are then processed further according to the particular application. Hot melt gravure printing is a special use of such hot melt adhesive granulates. This method is described, for instance, in Adhesives Age, December 1981, page 23. According to this method, the hot melt adhesive granulate is melted and applied by means of a gravure roller in punctiform fashion on a substrate, especially on a length of a textile material, which is to be coated with the hot melt adhesive. The lengths of textile material, so coated in punctiform fashion with the hot-melt adhesive can be heat sealed and thus combined firmly with other substrates, especially with other lengths of textile materials.

As already mentioned above, when a hot-melt adhesive granulate is used for the melt coating, a discoloration and a deterioration of mechanical properties occur, which cannot be avoided completely by the use of antioxidants of the state of the art. Moreover, there is an undesirable formation of skin, which interferes with the coating process, especially with the hot melt gravure printing process. Such interference with the application may also occur with other melt coatings, which are applied by a roller, etc.

The present invention is based on the task of avoiding such interference. It was discovered that this is possible in a surprisingly simple and far-reaching manner, if the hot-melt adhesive granulate has a coating of a film of paraffin, although it is known from the state of the art given above that paraffin is thought to be unsuitable for improving the processing properties of thermoplastic polymers.

The object of the invention therefore is a thermoplastic polymer containing an antioxidant, wherein (a) the thermoplastic polymer is a hot-melt adhesive granulate for melt coating, (b) the granulate has a coating of a film of paraffin with a melting point of 45° C. to 85° C. in an amount of up to 5% by weight based on the polymer and (c) the antioxidant is present in the film coating.

As thermoplastic, hot-melt adhesives, the above mentioned polymers, especially polyamides, polyesters and polyetheresteramides, which are used in accordance with the state of the art, can be employed. The melting ranges of the hot melt adhesives are adapted in a known manner to the intended application. Naturally, low-melting hot-melt adhesives are used to glue temperature-sensitive substrates. In this connection, reference is made to the numerous patents in this field, some of which have been named above.

It is an essential characteristic of the invention that the granulates have coating of a film of paraffin with a melting point of 45° C. to 85° C. The lower limit for the amount of paraffin is determined by such factors as the particle size and shape of the granulate particles and by the requirement that particles are coated essentially completely by a film. After the granulate is melted, this paraffin also forms a film in a surprisingly complete manner on the surface of the melt, thus protecting it against the action of air. As a rule, the lower limit is at about 0.1% by weight, based on the weight of the polymer, and preferably at about 0.5% by weight. The upper limit is not especially critical. An unnecessary excess is, however; uneconomic and also undesirable, because the paraffin does not contribute to the adhesion. Preferably, the upper limit is therefore at about 3% and especially at about 2% by weight.

The melting point of the paraffin is selected so that it is sufficiently far above room temperature, so that the film coating is not significantly destroyed even during storage and transport at elevated temperatures. The melting point of the paraffin should be sufficiently far, advisably about 10°, below the softening point of the hot-melt adhesive, so that the granulate can be coated with molten paraffin. Optimum results are achieved, when the melting point of the paraffin is higher than 50° C. On the other hand, a temperature of 70° C. and especially of 60° C. is preferred as the upper limit for the melting point of the paraffin. Excellent results have been obtained with conventional commercial paraffin wit a melting point of about 55° C. Commercially obtainable paraffins, advisably the purified varieties, may be used (mixtures of saturated hydrocarbons).

The antioxidants, used pursuant to the invention, are those, which are also used according to the state of the art for thermoplastic polymers, including hot-melt adhesives. Examples of these are inorganic substances such as halogen salts, phosphorus salts (phosphite salts), metal salts and sulfur compounds and organic compounds such as aromatic hydroxy compounds (such as IRGANOX 1010 ®) and aromatic nitrogen compounds (such as IRGANOX 1098 ®.

Antioxidants, added during the polycondensation according to the state of the art, must have adequate thermal stability. When thermally unstable antioxidants were used according to the state of the art, they were dusted onto the granulate. At the same time, they ought not to have a disadvantageous effect on the pourability of the granulate. It is a major disadvantage of the dusting procedure that demixing occurs during packaging, transport, storage and use, that is, that the antioxidant, which has been dusted on, comes off. These disadvantages do not occur with the method of the invention and thermally unstable antioxidants can also be used.

Pursuant to the invention, a particularly good effect is achieved if one or several antioxidants are present in the film coating. Naturally, antioxidants, such as those used in a known manner in the manufacture of the polymers, may moreover be present in the polymer itself. The amount of antioxidant corresponds to the amount used in accordance with the state of the art and advisably falls within the range from 0.01% to 3% by weight, based on the weight of the polymer. The lower limit advisably is about 0.05% and preferably about 0.1% by weight. The upper limit advisably is about 2% by weight and preferably about 1% by weight.

The antioxidant is dispersed largely uniform in the coating of paraffin film. If it is not dissolved in the paraffin, it is advisably present as a fine dispersion. This is achieved by a manufacturing procedure, which will be described later.

A further object of the invention is a method for the manufacture of the above-described thermoplastic polymer, wherein a granulate of a hot-melt adhesive polymer is mixed in mixing container with an amount of paraffin, sufficient for the formation of a film coating and comprising up to 5% by weight based on the polymer and having a melting point of 45° C. to 85° C. The granulate furthermore is mixed with antioxidants for hot-melt adhesives, which are known per se, at temperatures above the melting point of the paraffin and below the softening point of the hot-melt adhesive granulate and the granulate particles are cooled while in motion.

For this method, it is not necessary that the hot-melt adhesive granulate be dried.

During the premixing process, a surprisingly complete film of paraffin coats the granulate particles and, on later use during melting, a discoloration of the hot-melt adhesive and the formation of a skin is avoided to a surprisingly large extent.

If moisture is present in the mixing container while the paraffin film is being coated on the hot-melt adhesive granulate, it is advisably removed by drying after the mixing process and during and after the cooling process. This is accomplished easily by keeping the mixing container under a reduced pressure. To attain an essentially complete film coating on the granulate particles, it is advisable that the above-described mixing be carried out for a period of at least about 0.5 hours. Advisably, the mixing process should be carried out for at least 1 hour. The upper limit for the duration of the mixing process is determined essentially from an economic point of view. Mixing times, which are unnecessarily long are, of course, uneconomic. Advisably, therefore, the mixing times should not exceed 4, preferably not 3 and, more particularly, not 2 hours. The same consideration are valid for the cooling and drying processes. Cooling is carried out at room temperature, at which the granulate is then discharged. Any reduced pressure, which is available in the plant, such as a pressure up to 50 mbar or even up to 10 mbar, can be used for the drying.

A further object of the invention is the use of the thermoplastic polymers, described above and prepared according to the method described above, for the melt coating of substrates that are to be glued together, especially for hot-melt gravure printing, preferably of textiles.

EXAMPLE 1

A moist polyamide hot-melt adhesive (100 kg of Platamid ® MX1794, a copolyamide containing about 30% by weight of caprolactam, 40% by weight of lauric lactam and 30% by weight of equimolar amounts of hexamethylenediamine and decanedicarboxylic acid as monomer components) was mixed in a conventional commercial tumble dryer with 10 kg of an aqueous suspension of 1 kg of $NaH_2PO_2$ and 1 kg of commercially available fully refined paraffin DAB MP 54°/56° C. (from WINTERSHALL) and heated with agitation to 65° C. Subsequently, the material was dried under reduced pressure (10 mbar) for 10 hours.

After cooling (with agitation) to room temperature, the granulate was filled into 25 kg drums. The granulate was subsequently tested as follows:

1. Thermal Stability

The granulate was melted and kept for (a) 30 minutes and (b) 60 minutes in contact with oxygen in an aluminum pan at 230° C. in a forced air over. The melt was then cooled and the solidified mass evaluated visually, as listed in the following Table.

2. Thermal Stability After Simulated Transport Conditions

For this purpose, 1 kg of the granulate was shaken for 15 minutes on a conventional, commercial oscillating screen and subsequently subjected to the thermal oxidation test described in Item 1 above.

3. Paraffin Test

For this purpose, the granulate was treated for 5 seconds with an alcoholic solution of a polyamide dye (Sudan blue, 0.2% in methanol) and subsequently washed with clear tap water. A uniform paraffin coating on the granulate prevents dyeing the polyamide. Evaluation of the Color and of the Skin Formation:

+: no change
+−: slight change
−: clear change

EXAMPLES 2 AND 3

The hot-melt adhesive granulate used in Example 1 was treated by the method described in Example 1 with paraffin and antioxidants with formation of a paraffin coating. The amounts used are given in the following Table.

COMPARISON EXAMPLES I TO VI

The hot-melt adhesive granulate used for these comparison examples was the same as that used in Example 1. The amounts of paraffin and antioxidant, with which the hot-melt adhesive was treated, are given in the Table. The description of the type of treatment is abbreviated in column 3 of Table 1. The expression "of the invention" implies that the method employed in Example 1 of mixing one or several additives with the hot-melt adhesive granulate was used.

The expression "added during the polycondensation" implies that the additive or additives was/were added before or during the polycondensation for the preparation of the hot-melt adhesive granulate. A film coating, like that of the invention, is not formed by this method on the granulate.

The results of the Comparison Examples I to IV, as well as their stabilization system and method, are listed in the following Table 1.

The product listed in Comparison Example VI is a conventional, commercial hot-melt adhesive, made by Henkel (U.S.A.) and recommended for hot-melt gravure printing.

As is evident from the values given in Table 1, the examples of the invention show clear improvements over those of the state of the art with respect to skin formation and discoloration.

for at least 1 mm in at least one dimension. Cylindrical or ellipsoidal granulates or granulates in the shape of a

TABLE 1

| | Additives | Method of Addition | Thermal Stability after Manufacture | | After Simulated Transport Conditions | | Paraffin Test |
|---|---|---|---|---|---|---|---|
| | | | 30 min color/skin | 60 min color/skin | 30 min color/skin | 60 min color/skin | |
| Example 1 | 1% NaH$_2$PO$_2$ 1% paraffin | of the invention | +/ + | +−/ + | +/ + | +−/ + | Uniform coating, no staining of granulate |
| Example 2 | 1% NaNH$_2$PO$_2$ 0.5% paraffin | of the invention | +/ + | +−/ + | +/ + | +−/ + | Uniform coating, no staining of granulate |
| Example 3 | 0.5% NaNH$_2$PO$_2$ 1.5% paraffin | of the invention | +/ + | +/ + | +/ + | +/ + | Uniform coating, no staining of granulate |
| Comparison Example I | 1% paraffin | of the invention | +−/ + | −/ − | +−/ + | −/ − | Uniform Coating, no staining of granulate |
| Comparison Example II | 1% NaNH$_2$PO$_2$ | of the invention | +−/ +− | +−/ − | +−/ +− | −/ − | No film coating, granulate stained |
| Comparison Example III | 1% NaNH$_2$PO$_2$ | added during polycondensation | −/ +− | −/ − | −/ +− | −/ − | Like Comparison Example II |
| Comparison Example IV | 1% IRGANOX 1010 | added during the polycondensation | +−/ +− | +−/ − | +−/ +− | +−/ − | Like Comparison Example II |
| Comparison Example V | 1% NaNH$_2$PO$_2$ 1% paraffin | added during the polycondensation | +−/ +− | −/ − | +−/ +− | −/ − | Like Comparison Example II |
| Comparison Example VI | about 1.5% paraffin | unknown | +/ + | +−/ +− | +/ + | +−/ +− | Like Comparison Example II |

INSERTIONS FOR THE SPECIFICATIONS

During the mixing process, that is, during the formation of the coating of paraffin on the hot-melt adhesive granulate, it may be appropriate to add small amounts of a solvent, in which the antioxidant is soluble. A particularly fine dispersion of the antioxidant in the paraffin film is achieved in this manner. Of course, the solvent must not or must not substantially be soluble in the hot-melt adhesive. When the frequently used phosphite salts are used as antioxidant, it is appropriate to add a small amount of water, for example, so that as concentrated a solution as possible of the antioxidant in the solvent, in this case water, is formed.

The formation of a film coating as defined by the invention can be tested by the paraffin test that is described later. A paraffin coating in accordance with the invention is indicated if this test, that is, the treatment of the granulate with a polyamide-staining alcoholic solution and subsequently with water, produces essentially no noticeable change in the color of the hot-melt adhesive granulate.

The hot-melt adhesive granulate of the invention may contain the usual other additives, such as optical brighteners, plasticizers and nucleating agents.

The particle sizes of the granulate may vary within wide limits and correspond to the usual particle sizes in this area of technology. As a rule, the particles extend parallelepid may be used with dimensions of, for example 1.5×1.5×1.5 to 3.5×3.5×3.5 mm.

We claim:

1. A thermoplastic polymer containing an antioxidant, wherein
   (a) the thermoplastic polymer is a hot-melt adhesive granulate for melt coating,
   (b) the granulate has a coating of a film of paraffin with a melting point of 45° C. to 85° C. in an amount from 0.1 to 5% by weight based on the polymer and
   (c) the antioxidant is present in the film coating.

2. A method for the manufacture of a thermoplastic polymer defined in claim 1, wherein a granulate of a hot-melt adhesive polymer is mixed in mixing container with an amount of paraffin, sufficient for the formation of a film coating and comprising from 0.1 to 5% by weight based on the polymer and having a melting point of 45°4 C. to 85° C., and with antioxidants for hot-melt adhesives, which are known per se, at temperatures above the melting point of the paraffin and below the softening point of the hot-melt adhesive and the granulate particles are cooled while in motion.

3. The method of claim 2, wherein the drying procedure after the mixing procedure is carried out with agitation.

* * * * *